United States Patent [19]

McLaren et al.

[11] 4,407,426
[45] Oct. 4, 1983

[54] ROUND ICE CREAM CARTON LID

[75] Inventors: Edwin C. McLaren, Apple Valley; David J. Adamek, Minneapolis, both of Minn.

[73] Assignee: Champion International Corporation, Stamford, Conn.

[21] Appl. No.: 253,304

[22] Filed: Apr. 13, 1981

Related U.S. Application Data

[63] Continuation-in-part of Ser. No. 137,453, Apr. 4, 1980, Pat. No. 4,305,524.

[51] Int. Cl.³ ..................... B65D 41/18; B65D 43/03; G09F 3/20
[52] U.S. Cl. ..................... 220/306; 40/307; 206/508; 220/380; 229/43
[58] Field of Search ............... 220/306, 380; 206/508; 40/307; 229/43; 150/0.5

[56] References Cited

U.S. PATENT DOCUMENTS

| 2,984,382 | 5/1961 | Florsheim | 150/0.5 |
| 3,176,868 | 4/1965 | Crisci | 150/0.5 |
| 3,269,588 | 8/1966 | Ruekberg | 206/508 |
| 3,642,167 | 2/1972 | Kinney | 220/380 |
| 4,044,941 | 8/1977 | Kundsen | 229/43 |

Primary Examiner—George E. Lowrance
Attorney, Agent, or Firm—Evelyn M. Sommer

[57] ABSTRACT

A closure for a cylindrically shaped ice cream carton or the like includes a unitary circular shaped plastic lid provided with a depending skirt portion. The top surface of the lid includes an upwardly and inwardly extending concentric bead inwardly tapered on its outer surface to enhance retaining a plurality of similar lids in stacked relation. The bead rigidifies the lid, enhances nested stacking of lid-carton assemblies and provides a locking and protective recess for labels containing printed indicia. The skirt of the lid includes a lower outwardly tapered inner surface portion for mating with the outer surface of the bead to enhance nested stacking of the lids and to enable the lid to be grasped and readily removed from tight fitting engagement with an ice cream carton. An upper, inner annular recessed portion of the lid skirt accommodates expansion of the ice cream carton without the lid popping off the carton. The plastic injection gate is recessed in the top surface of the lid to protect the label and the base of a carton stacked thereon.

7 Claims, 4 Drawing Figures

U.S. Patent    Oct. 4, 1983    4,407,426
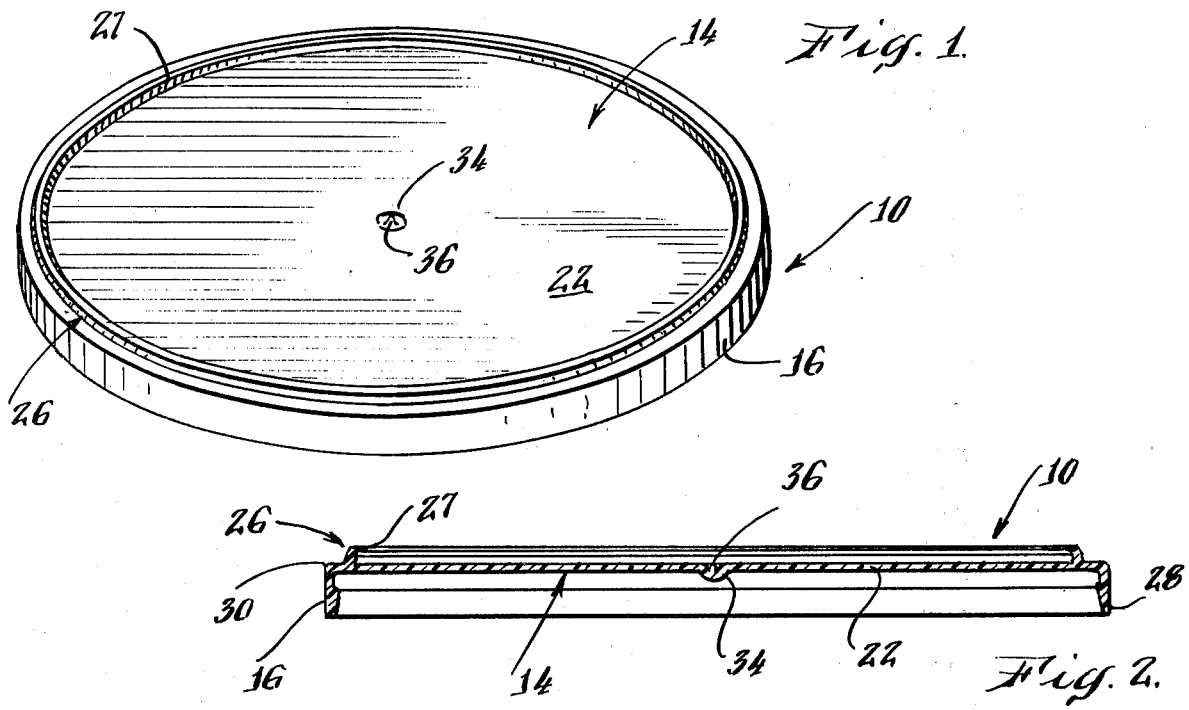
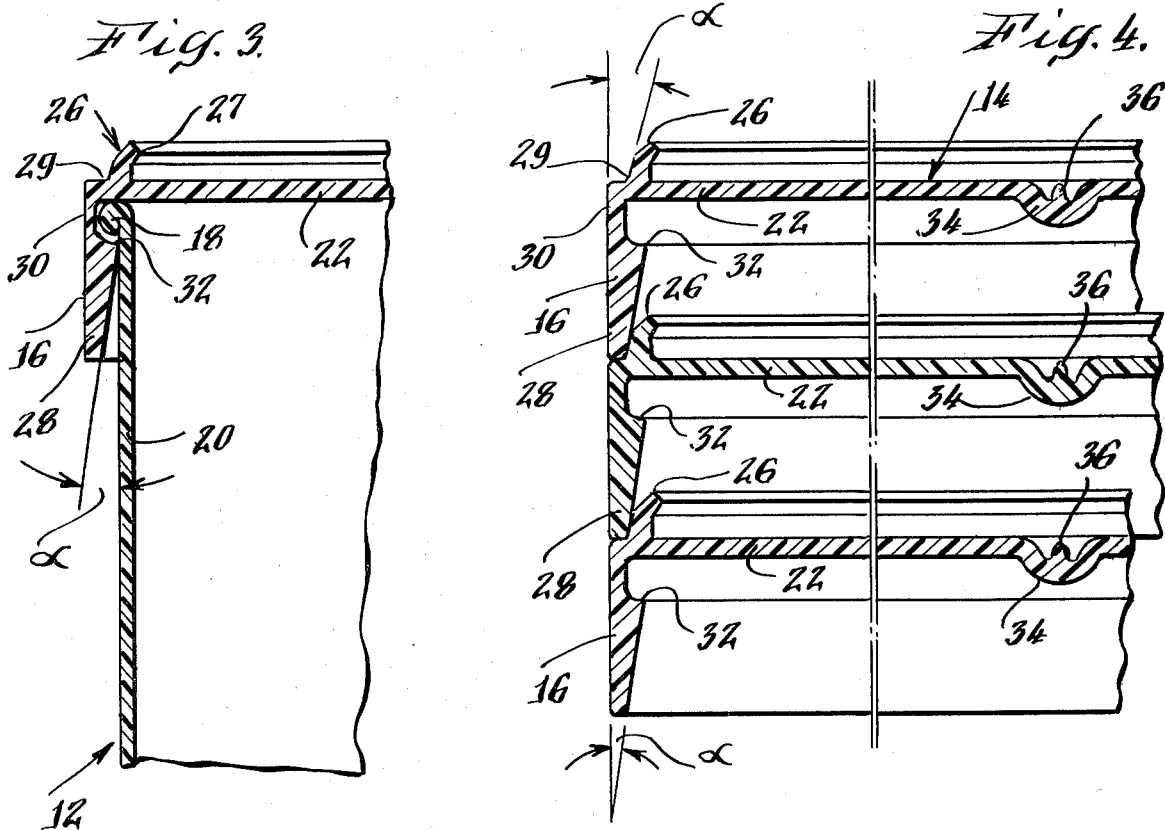

ROUND ICE CREAM CARTON LID

BACKGROUND OF THE INVENTION

This application is a continuation-in-part of U.S. Ser. No. 137,453, filed Apr. 4, 1980, now U.S. Pat. No. 4,305,524, for ROUND ICE CREAM CARTON LID by Edwin C. McLaren and David J. Adamek and assigned to the same assignee.

1. Field of the Invention

This invention generally relates to closures for packaging containers and more particularly, to a removable lid for a cylindrical container, such as a round ice cream carton or the like.

2. Description of the Prior Art

In the past, removable lids for cylindrical cartons used for packaging ice cream or the like have been formed from paper stock and are often of a two piece construction. One piece of the lid was formed from a strip of material folded in a manner to provide a rolled edge and a pair of essentially straight, parallel, spaced apart annular shaped side walls. When installed on the carton, the rolled edge of the lid engaged the upper rim of the carton while the side walls of the lid were respectively disposed on the inner and outer surface of the carton rim. The second piece of the lid consisted of a circularly shaped piece of paper stock having the periphery thereof provided with extensions suitable for attachment, as by gluing, to the inner side wall of the first mentioned piece of the lid. The second circular piece of the lid was normally preprinted with various indicia to identify the manufacturer or contents of the carton, prior to assembly of the separate pieces of the lid.

Others in the past have also devised a one piece lid formed from paper stock, which is simiar in construction design to the lid mentioned above and is provided with side walls forming a ring-shaped opening within which the rim of the carton is slidably received.

Prior art lids of the types described above are less than completely desirable for several reasons. First, the fit between the side walls of the lid and the carton rim was relatively loose unless sufficient friction could be produced between the side walls of the lid and the rim; this was sometimes achieved by spacing the side walls a distance marginally less than the thickness of the rim and/or extending the width of the lid side walls to create additional friction producing surface areas. Reduction of the spacing between the lid side walls naturally made it more difficult for a user to guide and start the carton rim into the opening between the side walls of the lid, and the provision of wider lid side walls necessitated the use of additional stock material, thereby diminishing manufacturing economy. In the case of a two piece paper stock lid construction, the additional labor costs associated with assembly thereof was also undesirable from the standpoint of economy. Finally, the necessity for preprinting the face of the lid, prior to assembly thereof added further undesirable manufacturing costs to this type of lid and also posed logistical problems since such lids could not be assembled and installed on the cartons prior to the application of the necessary printed indicia. Also, once these prior art lids were installed on the cartons, it was sometimes difficult to remove the lids since the outer side walls of the lid was, by necessity, closely contoured to the outer surface areas of the carton, making it difficult to apply upwardly directed pressure on the free extremity of the lid side wall.

Finally, because of the close proximity of the lid to the side walls of the carton, the ice cream in the carton, when removed from a refrigerator, would have a tendency to thaw, and when replaced in the refrigerator would expand, often popping the lid from the carton rim.

From the foregoing, it is clear that a need exists in the art for a circular lid for closing the end of a cylindrically shaped carton which is not only economical from a manufacturing standpoint, but easy to install and remove from the carton and allows the application thereto and the protection from damage of a label having preprinted indicia thereon. Further, such a carton lid should be capable of being tightly adhered to seal the carton and provide the requisite closure therefor under all the conditions of use of the carton. An additional desirability in such a carton lid would be enhanced nested stacking of the lids themselves and of the carton and lid assemblies when the lids are installed on the cartons. Moreover, protection of the printed labels and the bases of the stacked cartons would enhance marketability of the product.

SUMMARY OF THE INVENTION

The present invention provides a lid which satisfies each of the aforementioned needs. According to the present invention, a closure for a cylindrically shaped ice cream carton or the like includes a unitary circular shaped plastic lid provided with a depending skirt portion. The top surface of the lid includes an upwardly and inwardly extending concentric bead inwardly tapered on its outer surface to enhance retaining a plurality of similar lids in stacked relation and to give rigidity to the lid. The top surface of the lid also includes a centrally located area within the bead which enhances nested stacking of lid-carton assemblies or composites and provides a locking and protecting recess for labels containing printed indicia. The skirt of the lid includes a lower outwardly tapered inner surface portion for mating with the outer surface of the bead to enhance nested stacking of the lids and to enable the lid to be grasped and readily removed from the tight fitting engagement with a ice cream carton. An upper, inner circular recessed portion of the lid skirt accommodates expansion of the ice cream carton without the lid popping off the carton. The plastic injection gate is recessed in the top surface of the lid to protect the label and the base of a carton stacked thereon.

BRIEF DESCRIPTION OF THE DRAWINGS

Further objects and advantages of the invention will become apparent from the following description claims, and from the accompanying drawing, wherein:

FIG. 1 is a perspective view of the lid or closure of the present invention;

FIG. 2 is a cross-sectional view of the lid of FIG. 1 taken substantially along the plane indicated by line 2—2 of FIG. 1;

FIG. 3 is an enlarged cross-sectional view of a portion of the lid of FIG. 2, applied to a cylindrical container; and FIG. 4 is a cross-sectional view of a portion of the lids of the present invention, with the lids stacked for storage.

DETAILED DESCRIPTION OF THE PREFERRED EMBODIMENT

Referring now to the drawing in detail, wherein like numerals indicate like elements throughout the several views, a closure 10 particularly adapted for use with a cylindrically shaped ice cream carton 12 or the like generally comprises a circularly shaped disc portion 14 provided with an annular, depending skirt 16. The circularly shaped disc 14 is adapted to close the mouth of carton 12 and the annular skirt 16 is adapted to abut the rim or lip 18 and side walls 20 of carton 12.

The closure or lid 10 is preferably made from low density polyethylene material. Disc portion 14 includes a centrally located, flat top surface portion or planar area 22 bordered by an upwardly and inwardly extending bead 26. The bead 26 tends to rigidify the lid structure. The circular planar area 22 of disc portion 14 of lid 10 can also receive a preprinted label which will lock under the annular inner extremity 27 of the bead 26.

The bead 26 is provided on the upper surface of disc 14 adjacent the outer circumferential, peripheral edge of the disc. As illustrated in FIG. 4, the upright rim 26 on each lid 10 has a tapered outer surface 29 which enables the lids to be stacked during storage so that they do not move radially with respect to each other. Typically, the taper is formed at an acute angle α of 15° from the vertical. Also, the lower inner extremity of the skirt 16 on each lid is tapered with angle α to mate with surface 29 and provide nested stacking of the lid.

The skirt portion 16 of each closure or lid 10 includes, in addition to lower portion 28, an upper portion 30. As stated above, lower or terminal portion 28 of skirt 16 has an inner edge making an angle α of approximately 15° with the vertical. The outer edge of skirt portion 28 is contiguous with the outer edge of the upper skirt portion 30. The inner edge of the upper portion 30 of skirt 16 is undercut so as to provide an annular shoulder 32 defining the boundary between the lower and upper portions 28 and 30 of skirt 16.

By virtue of the outward flare of the lower portion 28 of skirt 16 the skirt 16 and lid 10 is readily slid over the extended rim 18 and side wall 20 of round ice cream carton 12 and rim 18 is readily seated between the lower surface of the central circular disc portion 14 and shoulder 32 of skirt 16 to lock the lid 10 to the carton 12. Further, because of the outward flare of lower portion 28 of skirt 16, a finger can be inserted beneath the lid and the skirt portion 16 pivoted outwardly so that shoulder 32 can clear the rim so that the skirt can be removed along with the lid from the carton 12.

It should also be noted that the rim 18 is spaced slightly inwardly from the inner surface of the upper portion 30 of skirt 16 when lid or closure 10 is snapped over the mouth of carton 12. This permits for expansion of the ice cream carton 12 upon subsequent refreezing and expansion after removal from a refrigerator, precluding the lid from popping off the carton 12. Even should expansion upon refreezing of the ice cream within the carton be pronounced, by virtue of the deviation of the inner edge of lower skirt portions 28 from the vertical by the angle α, the skirt can be grasped for pivotal movement outwardly to remove the lid 10 from sealing engagement of the shoulder 32 with the rim 18.

The top surface portion or planar area 22 within the concentric bead 26 has a recess 34 in which the plastic injection gate 36 is located so that it will not normally damage the label or the base of a lid-carton assembly or composite stacked thereupon. The dimension of the inner annular extremity 27 of the bead 26 being dimensioned so as to receive the base of a lid-carton composite stacked thereupon to enable creation of a nested stack of lid-carton composites for storage space economy.

What is claimed is:

1. A closure for an ice cream carton or the like of the type having a circular rim defining a dispensing opening therein, comprising:
    a unitary, circularly shaped lid including a circular disc having on its top surface a concentric continuous uninterrupted bead which has a lower portion and an upwardly and inwardly extending continuous uninterrupted annular upper overhanging extremity portion having an inwardly angled outer surface and an inwardly angled inner surface,
    said lower portion having an outer angled surface and a substantially straight inner surface,
    said lid further including an annular skirt portion depending downwardly from the periphery of said circular disc,
    a smooth annular portion of said top surface extending between said bead and the periphery of said disc, said annular portion being on the same plane as said lid portion,
    said skirt portion including an upper and lower portion, having a smooth contiguous outer surface and the inner surface of said upper skirt portion being recessed radially inwardly with respect to the inner surface of the lower portion of said skirt to define a locking shoulder therebetween, and
    the inner surface of said lower skirt portion being flared outwardly at an acute angle with respect to the vertical.

2. The closure of claim 1 in which a portion of the outer surface of the bead extends upwardly and inwardly at an acute angle with respect to the vertical to mate with the inner surface of the lower skirt portion to enhance nested stacking of the lid with like lids.

3. The closure of claim 2 in which the acute angle of the inner surface of the lower skirt portion and the acute angle of the outer surface of the bead are substantially the same.

4. The closure of claim 1 wherein said angle is approximately 15°.

5. The closure of claim 1 in which the inner annular extremity of the bead is dimensioned to receive the base of a lid-carton composite stacked thereupon.

6. The closure of claim 1 in which the top surface portion within said concentric bead includes a label which locks under the inner annular extremity of the bead.

7. The closure of claim 1 in which the top surface portion within said concentric bead includes a recess in which the plastic injection gate is located so that it will not normally damage the label or the base of a lid-carton composite stacked thereupon.

* * * * *